(12) United States Patent
Falzon et al.

(10) Patent No.: US 9,952,403 B2
(45) Date of Patent: Apr. 24, 2018

(54) METHOD FOR MANUFACTURING A MIRROR

(71) Applicant: THALES, Courbevoie (FR)

(72) Inventors: Frédéric Falzon, Cannes la Bocca (FR); Christophe Devilliers, Cannes la Bocca (FR); Cyrille Laborde, Cannes la Bocca (FR)

(73) Assignee: THALES, Courbevoie (FR)

( * ) Notice: Subject to any disclaimer, the term of this patent is extended or adjusted under 35 U.S.C. 154(b) by 257 days.

(21) Appl. No.: 14/752,314

(22) Filed: Jun. 26, 2015

(65) Prior Publication Data

US 2015/0378128 A1    Dec. 31, 2015

(30) Foreign Application Priority Data

Jun. 27, 2014 (FR) .................................... 14 01452

(51) Int. Cl.
| | | |
|---|---|---|
| *G02B 7/18* | (2006.01) | |
| *G02B 7/183* | (2006.01) | |
| *G02B 5/10* | (2006.01) | |
| *G02B 23/00* | (2006.01) | |
| *G02B 5/09* | (2006.01) | |

(52) U.S. Cl.
CPC .............. *G02B 7/181* (2013.01); *G02B 5/09* (2013.01); *G02B 5/10* (2013.01); *G02B 7/183* (2013.01); *G02B 23/00* (2013.01)

(58) Field of Classification Search
CPC ........ B64G 1/2222; F24J 2/1057; G02B 5/09; G02B 7/181; G02B 7/183
See application file for complete search history.

(56) References Cited

U.S. PATENT DOCUMENTS

| | | | | |
|---|---|---|---|---|
| 3,541,825 A | * | 11/1970 | Reader ................. | B21D 53/883 359/900 |
| 4,574,457 A | * | 3/1986 | Farnum, III .......... | B21D 26/02 156/285 |
| 5,067,282 A | * | 11/1991 | Netzel ................... | B24B 13/015 451/11 |
| 5,118,552 A | * | 6/1992 | Sempolinski ........... | C03B 19/06 428/116 |
| 5,347,401 A | * | 9/1994 | Hugenell ............... | G02B 7/183 359/853 |
| 5,353,231 A | | 10/1994 | Sasaki et al. | |
| 6,176,588 B1 | * | 1/2001 | Davis, Jr. ............... | G02B 7/182 359/848 |
| 7,273,288 B1 | * | 9/2007 | Schwartz ............... | G02B 7/183 156/107 |

(Continued)

FOREIGN PATENT DOCUMENTS

| | | |
|---|---|---|
| FR | 2 633 726 A1 | 1/1990 |
| JP | H08-94813 A | 4/1996 |
| WO | 2013/011049 A1 | 1/2013 |

*Primary Examiner* — Jacob Cigna

(74) *Attorney, Agent, or Firm* — Baker & Hostetler LLP

(57) ABSTRACT

A method for producing a mirror comprising a plurality of optical surfaces, the method comprises: a step of producing elements, step of assembling the elements with each other from the rear, a step of fixing the elements from the rear onto a supporting structure of the mirror, and a step of polishing subsequent to the step of fixing the elements in order to obtain the optical surfaces of the mirror and correct the residual positioning defects of the optical surfaces and polish them.

20 Claims, 2 Drawing Sheets

(56) References Cited

U.S. PATENT DOCUMENTS

| | | | | |
|---|---|---|---|---|
| 8,864,324 B2* | 10/2014 | Seibert | ............... | G02B 7/183 |
| | | | | 359/869 |
| 2002/0192422 A1* | 12/2002 | Conzone | ............... | C03C 27/044 |
| | | | | 428/64.1 |
| 2004/0233523 A1* | 11/2004 | Hachkowski | ......... | B64G 1/222 |
| | | | | 359/430 |
| 2005/0037224 A1* | 2/2005 | Orford | ............... | B21D 26/02 |
| | | | | 428/593 |
| 2005/0141108 A1* | 6/2005 | Atkinson | ............ | G02B 7/183 |
| | | | | 359/820 |
| 2007/0279778 A1* | 12/2007 | Schwartz | ............ | G02B 7/183 |
| | | | | 359/871 |
| 2012/0182636 A1* | 7/2012 | Seibert | ............... | G02B 7/183 |
| | | | | 359/869 |
| 2015/0077874 A1* | 3/2015 | Naepflin | ............ | G02B 7/1822 |
| | | | | 359/872 |

* cited by examiner

METHOD FOR MANUFACTURING A MIRROR

CROSS-REFERENCE TO RELATED APPLICATIONS

This application claims priority to foreign French patent application No. FR 1401452, filed on Jun. 27, 2014.

FIELD OF THE INVENTION

The field of the invention relates to optical surfaces for space observation and, more precisely, to a method for manufacturing optical surfaces.

BACKGROUND

The invention is particularly appropriate for mirrors having large dimensions; typically the largest dimension being greater than 1.5 m.

At present, mirrors having large dimensions are produced either by assembling a plurality of optical surfaces having small dimensions, or by the overall production of a large monolithic mirror.

Mirrors produced by assembling a plurality of optical surfaces having small dimensions have to be associated with an active system making it possible to move the optical surfaces with respect to each other in order to optimize the alignment of the optical surfaces.

A second solution consists of manufacturing a mirror by assembling optical surfaces having smaller dimensions which are then polished. In this case, the areas of assembly of the optical surfaces (assembly by bonding, brazing welding, etc.) form part of the mirror and must therefore be as stable as the optical surfaces of the mirror.

A third solution consists of producing a monolithic mirror. This type of method necessitates production means of sufficient size for producing the structure of the mirror. The production of mirrors using this method is costly or even impossible for mirrors having very large dimensions.

SUMMARY OF THE INVENTION

The invention proposes a solution making it possible to overcome the abovementioned disadvantages notably by proposing an assembly of the optical surfaces constituting the mirror from the rear using a supporting structure made from a material having thermoelastic stability equivalent to that of the optical surfaces of the mirror. Thus, the assembly is not carried out from the polished side of the mirror.

According to one aspect of the invention, there is proposed a method for producing a mirror comprising a plurality of optical surfaces, the method comprising:
a step of producing elements,
a step of assembling the elements with each other from the rear,
a step of fixing the elements from the rear onto a supporting structure of the mirror, and
a step of polishing the elements subsequent to the step of fixing the elements onto the supporting structure and of assembly of the elements with each other in order to obtain the optical surfaces and correct the residual positioning defects of the optical surfaces.

Advantageously, the difference in coefficient of thermal expansion between the elements and the supporting structure being less than a threshold value, the threshold value is 5 µm/m/K. Alternatively, the elements and the supporting structure comprise materials having identical thermoelastic characteristics.

Advantageously, the elements comprise Zerodur (registered trademark) or $Si_3N_4$ (Silicon Nitride) or SiC (Silicon Carbide) or any other material compatible with space optics applications.

The invention makes it possible to obtain ultra-stable optical mirrors having very low thermal expansion, within the operating temperature range, and compatible with the requirements of space observation.

Advantageously, the means of fixing the elements have a coefficient of thermal expansion similar to the coefficient of thermal expansion of the material of the elements and of the supporting structure; in other words, the difference in coefficient of thermal expansion between the fixing means and the elements is less than the threshold value.

Preferably, the areas of assembly or means of fixing the elements of the mirror do not form part of the polished optical surface.

Advantageously, the elements are of hexagonal shape, the assembly of the elements forming a polygon.

Advantageously, the mirror comprises an opening inside the polygon.

BRIEF DESCRIPTION OF THE DRAWINGS

The invention will be better understood on studying some embodiments described as examples that are in no way limiting and illustrated by the appended drawings in which.

DETAILED DESCRIPTION

The invention proposes a method particularly well suited for the production of mirrors having large dimensions, and notably of mirrors whose largest dimension is greater than 1.5 m. The mirrors according to the invention can possibly be associated with an active system for positioning the optical surfaces.

Figure 1:
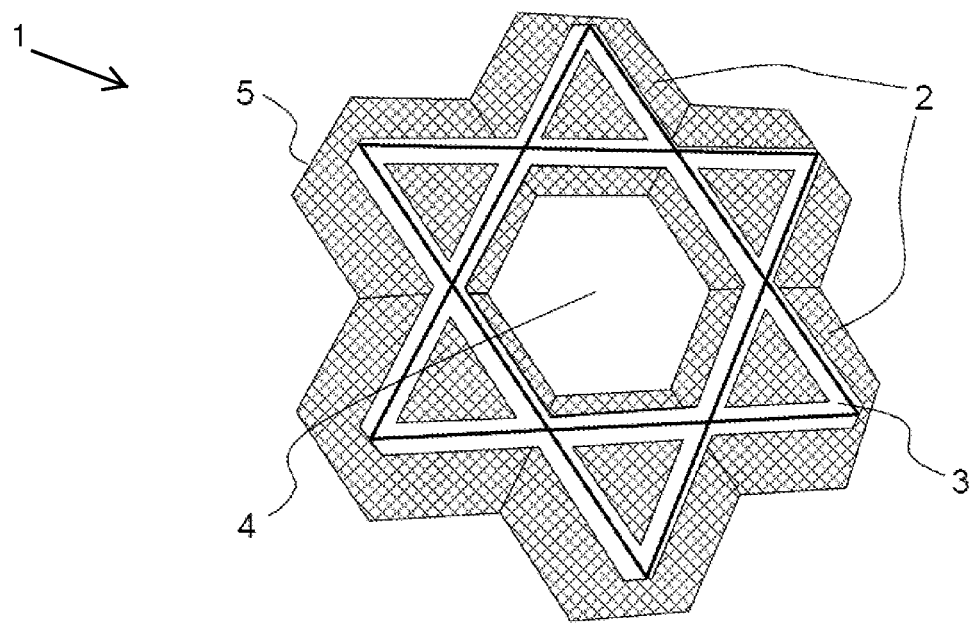
FIG. 1 shows a view of the rear face of a mirror obtained by the described method according to the invention.

FIG. 1 shows a mirror obtained by the method according to the invention. The mirror 1 comprises a plurality of elements 2 fixed onto a supporting structure 3.

The elements 2 comprise a material having a low coefficient of thermal expansion such as Zerodur (registered trademark), silicon nitride, silicon carbide or any other material compatible with space optics applications. Low coefficient of thermal expansion refers to coefficients of thermal expansion of less than about 5 µm/m/K, in the operating temperature range. Elements refer to constituent portions of the mirror and of which one of the faces intended to constitute a part of the optical surface is not yet polished. They can have any geometry; in this instance the elements are of hexagonal shape.

The structure 3 comprises a material also having a low coefficient of thermal expansion. It can have different geometric shapes, for example in the form of a crossed double triangle, of a circular shape or in the form of a set of ribs.

The thermal expansions of the elements 2 and of the supporting structure 3 are equivalent. Preferably, the elements 2 and the supporting structure 3 comprise identical materials.

The assembly of the elements 2 preferably has a polygonal geometry. The mirror 1 possibly has an opening 4 at the center making it possible to place a secondary mirror facing the opening 4.

The elements 2 are fixed on the supporting structure 2 by bonding, by brazing, by screwed connection or by any other fixing means 5. The fixing means 5 preferably comprise a material whose coefficient of thermal expansion is equivalent to the coefficient of thermal expansion of the elements 2.

Figure 2:
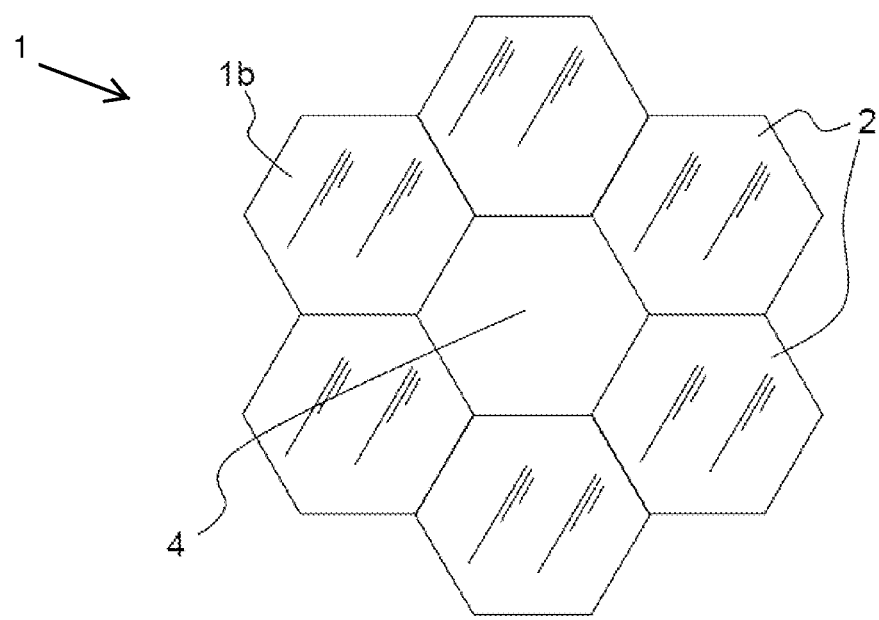
FIG. 2 shows a view of the front face of the mirror, and FIG. 3 show a block diagram of the method according to the invention.

FIG. 2 shows a view of the reflecting surface of the mirror produced according to one aspect de the invention.

The front faces of the elements 2 constitute optical surfaces after polishing, the assembly of the optical surfaces constituting the reflecting surface 1b of the mirror 1. As the elements 2 are fixed from the rear, the reflecting surface 1b of the mirror 1 is free of fixing means 5. As the elements 2 are polished after they have been fixed onto the supporting structure 3, the reflecting surface 1b is perfectly smooth in order to allow space observation.

Mirrors obtained in this way are ultra-stable thermally; the expansions of the elements 2, of the supporting structure 3 and of the fixing means 5 being equivalent. Moreover, this type of mirror 1 does not require an active system for repositioning the various elements of the mirror with respect to each other.

Figure 3:
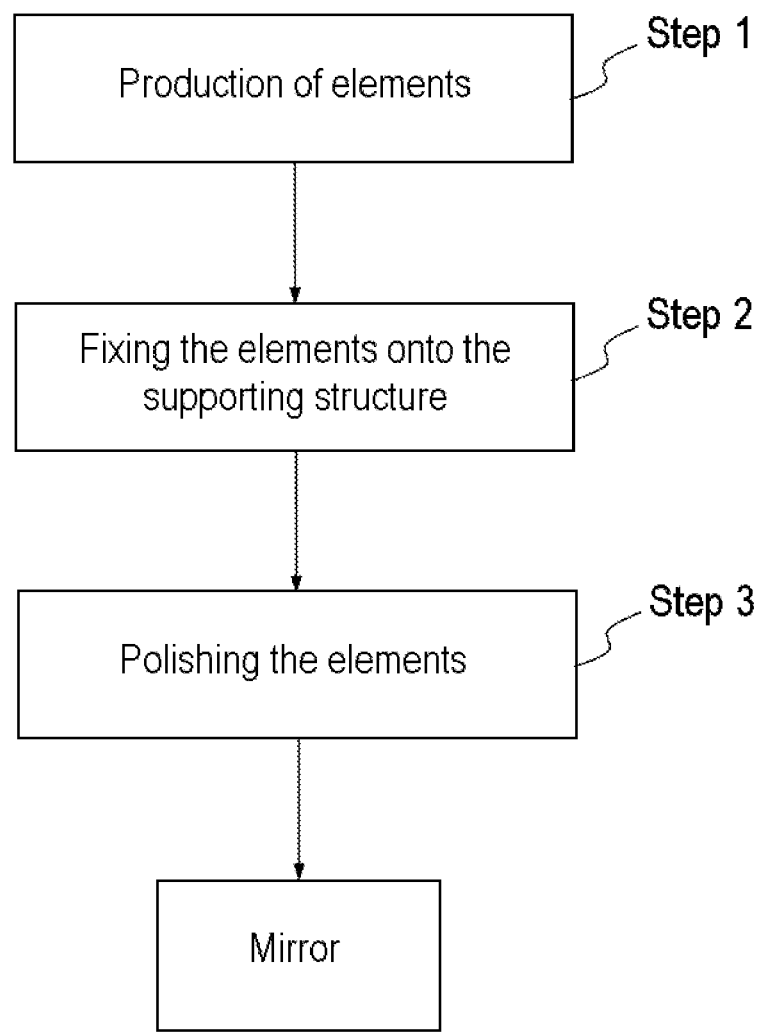

The principle of the method whose block diagram is shown in FIG. 3 comprises a step of production of the elements 2, a step of assembly, from the rear, of the elements with each other and a step of fixing the elements 2, from the rear, onto the supporting structure 3, the elements not being polished during the step of assembly with each other and of fixing onto the supporting structure 3, the polishing step being subsequent to the assembly and fixing step. In other words, the elements 2 are fixed to each other and to the supporting structure 3 on the side opposite to the reflecting surface 1b.

This method has the advantage of producing the elements 2 before assembling them onto the supporting structure 3. The heat treatments to which the elements 2 are subjected can be carried out in a furnace traditionally used for this purpose and does not require any particular investment. This method moreover makes it possible to produce a mirror 1 no matter what its dimensions may be.

Moreover, as the polishing step is carried out after the assembly of the elements 2, the reflecting surface 1b is perfectly smooth and compatible with the performance required for space observation.

The invention claimed is:

1. A method for producing a mirror having a plurality of optical surfaces disposed around an opening, the method comprising:
    a step of producing independently a plurality of elements, a face of each element in the plurality of elements contributing to an optical surface of said mirror;
    a step of fixing the plurality of elements together by a side reverse from said face and onto a supporting structure of the mirror, said supporting structure maintaining the opening; and
    a step of global polishing of said respective faces of the plurality of elements fixed together subsequent to the step of fixing the plurality of elements onto the supporting structure to obtain the optical surface of the mirror and correct residual positioning defects of the optical surface,
    wherein a difference in a coefficient of thermal expansion between the elements and the supporting structure is less than a threshold value; and
    wherein the threshold value is 5 μm/m/K.

2. The method as claimed in claim 1, wherein the elements and the supporting structure comprise materials having identical thermoelastic characteristics.

3. The method as claimed in claim 1, wherein the difference in the coefficient of thermal expansion between means for fixing the elements onto the supporting structure and said elements is less than said threshold value.

4. The method as claimed in claim 1, wherein the elements comprise, Si3N4 (Silicon Nitride) or SiC (Silicon Carbide) or a material compatible with space optics applications.

5. The method as claimed in claim 1, wherein said elements are of hexagonal shape, and wherein an assembly of the elements forms a polygon.

6. The method as claimed in claim 5, wherein the opening is inside the polygon.

7. A method for producing a mirror having a plurality of optical surfaces disposed around an opening, the method comprising:
    a step of producing independently a plurality of elements, a face of each element in the plurality of elements contributing to an optical surface of said mirror;
    a step of fixing the plurality of elements together by a side reverse from said face and onto a supporting structure of the mirror, said supporting structure maintaining the opening; and
    a step of global polishing of said respective faces of the plurality of elements fixed together subsequent to the step of fixing the plurality of elements onto the supporting structure to obtain the optical surface of the mirror and correct residual positioning defects of the optical surface,
    wherein the elements and the supporting structure comprise materials having identical thermoelastic characteristics.

8. The method as claimed in claim 7, wherein the elements comprise, Si3N4 (Silicon Nitride) or SiC (Silicon Carbide) or a material compatible with space optics applications.

9. The method as claimed in claim 7, wherein said elements are of hexagonal shape, and wherein an assembly of the elements forms a polygon.

10. The method as claimed in claim 9, wherein the opening is inside the polygon.

11. The method as claimed in claim 7, wherein a difference in a coefficient of thermal expansion between the elements and the supporting structure is less than a threshold value.

12. The method as claimed in claim 11, wherein the threshold value is 5 μm/m/K.

13. The method as claimed in claim 11, wherein the difference in the coefficient of thermal expansion between means for fixing the elements onto the supporting structure and said elements is less than said threshold value.

14. A method for producing a mirror having a plurality of optical surfaces disposed around an opening, the method comprising:
    a step of producing independently a plurality of elements, a face of each element in the plurality of elements contributing to an optical surface of said mirror;

a step of fixing the plurality of elements together by a side reverse from said face and onto a supporting structure of the mirror, said supporting structure maintaining the opening; and a step of global polishing of said respective faces of the plurality of elements fixed together subsequent to the step of fixing the plurality of elements onto the supporting structure to obtain the optical surface of the mirror and correct residual positioning defects of the optical surface, wherein the elements and said supporting structure comprise, $Si_3N_4$ (Silicon Nitride) or SiC (Silicon Carbide) or a material compatible with space optics applications.

15. The method as claimed in claim 14, wherein a difference in a coefficient of thermal expansion between the elements and the supporting structure is less than a threshold value.

16. The method as claimed in claim 15, wherein the threshold value is 5 μm/m/K.

17. The method as claimed in claim 15, wherein the difference in the coefficient of thermal expansion between means for fixing the elements onto the supporting structure and said elements is less than said threshold value.

18. The method as claimed in claim 14, wherein the elements and the supporting structure comprise materials having identical thermoelastic characteristics.

19. The method as claimed in claim 14, wherein said elements are of hexagonal shape, and wherein an assembly of the elements forms a polygon.

20. The method as claimed in claim 19, wherein the opening is inside the polygon.

* * * * *